(12) United States Patent
Nakagawa et al.

(10) Patent No.: US 11,276,377 B2
(45) Date of Patent: Mar. 15, 2022

(54) ELECTRONIC APPARATUS

(71) Applicant: DENSO CORPORATION, Kariya (JP)

(72) Inventors: Kunihiro Nakagawa, Kariya (JP); Shigehiro Nishimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/951,613

(22) Filed: Nov. 18, 2020

(65) Prior Publication Data

US 2021/0074244 A1 Mar. 11, 2021

Related U.S. Application Data

(63) Continuation of application No. PCT/JP2019/013671, filed on Mar. 28, 2019.

(30) Foreign Application Priority Data

May 23, 2018 (JP) .............................. JP2018-098783

(51) Int. Cl.
| | |
|---|---|
| *G09G 5/373* | (2006.01) |
| *G06F 3/01* | (2006.01) |
| *G06F 3/044* | (2006.01) |
| *G06F 3/0484* | (2013.01) |
| *G06F 3/0488* | (2013.01) |
| *G06F 3/16* | (2006.01) |

(Continued)

(52) U.S. Cl.
CPC .............. *G09G 5/373* (2013.01); *G06F 3/016* (2013.01); *G06F 3/044* (2013.01); *G06F 3/0488* (2013.01); *G06F 3/04842* (2013.01); *G06F 3/16* (2013.01); *G09G 5/02* (2013.01); *G09G 2354/00* (2013.01)

(58) Field of Classification Search
CPC ...... G09G 5/373; G09G 5/02; G09G 2354/00; G06F 3/016; G06F 3/044; G06F 3/04842; G06F 3/0488; G06F 3/16; G06F 3/167; G06F 3/01; G06F 3/041; G06F 3/0484
See application file for complete search history.

(56) References Cited

U.S. PATENT DOCUMENTS

2002/0149561 A1* 10/2002 Fukumoto ............... G06F 3/016
 345/156
2009/0102805 A1* 4/2009 Meijer .................... G06F 3/016
 345/173
(Continued)

FOREIGN PATENT DOCUMENTS

| JP | 2005332063 A | 12/2005 |
|---|---|---|
| JP | 2011501298 A | 1/2011 |

(Continued)

*Primary Examiner* — David D Davis
(74) *Attorney, Agent, or Firm* — Harness, Dickey & Pierce, P.L.C.

(57) ABSTRACT

An electronic apparatus includes a touch panel, a vibration generator configured to vibrate the touch pane, a sound generator, and a controller. In response to an operation by the user onto the operation unit, in addition to a control provided to the vibration generator to cause the touch panel to vibrate, the controller performs (i) a control provided to the display screen to change displaying of the operation unit, or (ii) a control provided to the sound generator to generate a sound, or (iv) both the control provided to the vibration generator and the control provided to the sound generator.

16 Claims, 8 Drawing Sheets

(51) Int. Cl.
*G09G 5/02* (2006.01)
*G06F 3/04842* (2022.01)

(56) References Cited

U.S. PATENT DOCUMENTS

| | | | |
|---|---|---|---|
| 2011/0018825 A1* | 1/2011 | Kondo | G06F 3/0433 345/173 |
| 2012/0133496 A1 | 5/2012 | Aono | |
| 2013/0141378 A1* | 6/2013 | Yumiki | G06F 3/016 345/173 |
| 2013/0268875 A1* | 10/2013 | Han | G06F 9/451 715/769 |
| 2013/0268877 A1 | 10/2013 | Han et al. | |
| 2015/0054741 A1* | 2/2015 | Yamano | G06F 3/0488 345/158 |
| 2015/0198977 A1 | 7/2015 | Takizawa et al. | |
| 2015/0205472 A1 | 7/2015 | Han et al. | |
| 2015/0346978 A1 | 12/2015 | Han et al. | |
| 2015/0370330 A1 | 12/2015 | Aono | |
| 2016/0041735 A1 | 2/2016 | Han et al. | |
| 2016/0192067 A1* | 6/2016 | Obana | A63F 13/533 381/334 |
| 2016/0283089 A1 | 9/2016 | Han et al. | |
| 2016/0349846 A1* | 12/2016 | Sugiura | G06F 3/03547 |
| 2016/0370980 A1 | 12/2016 | Han et al. | |
| 2017/0010795 A1 | 1/2017 | Han et al. | |
| 2017/0228140 A1 | 8/2017 | Han et al. | |
| 2017/0255371 A1 | 9/2017 | Han et al. | |
| 2018/0196586 A1 | 7/2018 | Han et al. | |
| 2018/0314410 A1 | 11/2018 | Han et al. | |
| 2019/0179521 A1 | 6/2019 | Han et al. | |

FOREIGN PATENT DOCUMENTS

| | | |
|---|---|---|
| JP | 2011048408 A | 3/2011 |
| JP | 2013218689 A | 10/2013 |
| JP | 2015133019 A | 7/2015 |
| JP | 2015162152 A | 9/2015 |
| JP | 2015222489 A | 12/2015 |

* cited by examiner

FIG. 5
COMPARATIVE

FIG. 8
COMPARATIVE

ELECTRONIC APPARATUS

CROSS REFERENCE TO RELATED APPLICATIONS

The present application is a continuation application of International Patent Application No. PCT/JP2019/013671 filed on Mar. 28, 2019, which designated the U.S. and claims the benefit of priority from Japanese Application No. 2018-098783 filed on May 23, 2018. The entire disclosures of all of the above applications are incorporated herein by reference.

TECHNICAL FIELD

The present disclosure relates to an electronic apparatus.

BACKGROUND

An operation function of a device equipped with a touch sensor, for example, a touch sensor of a smartphone or a car navigation system is executed by operating an icon, a switch, or the like displayed on the liquid crystal display with a finger. However, when operating a switch or the like displayed on the touch sensor, compared to mechanical switches such as a tact switch and a metal contact switch, feedback at the time of operation, for example, a click feeling or a feeling of unevenness is not transmitted to the user's finger.

SUMMARY

According to an aspect of the present disclosure, an electronic apparatus is provided to include a touch panel, a vibration generator, a sound generator, and a controller. In response to an operation by the user onto the operation unit, in addition to a control provided to the vibration generator to cause the touch panel to vibrate, the controller performs (i) a control provided to the display screen to change displaying of the operation unit, or (ii) a control provided to the sound generator to generate a sound, or (iv) both the control provided to the vibration generator and the control provided to the sound generator.

BRIEF DESCRIPTION OF DRAWINGS

The objects, features, and advantages of the present disclosure will become more apparent from the following detailed description with reference to the accompanying drawings. In the drawings.

DETAILED DESCRIPTION

Hereinafter, embodiments of the present disclosure are described with reference to the drawings. In the following description, the same elements as those described above are designated by the same reference signs, and the description thereof will be omitted.

First Embodiment

An electronic apparatus 1 according to a first embodiment is used as, for example, an operation panel for a vehicle. In many cases, the electronic apparatus 1 is arranged in a front center of the vehicle at a position visible and operable from a driver seat or a passenger seat. The electronic apparatus 1 functions as, for example, an operation apparatus for operating various functions such as a car navigation system, an air conditioner, an audio system, and a display that displays various kinds of vehicle information.

Figure 1:
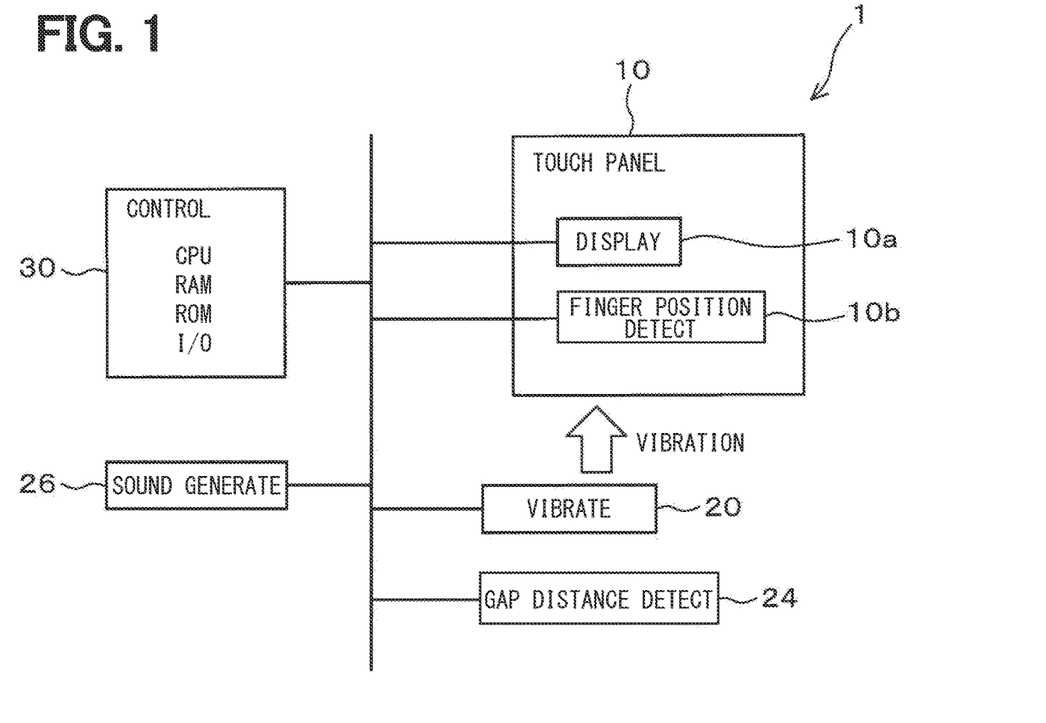
FIG. 1 is a block diagram illustrating a schematic configuration of an electronic apparatus according to a first embodiment.
Figure 2:
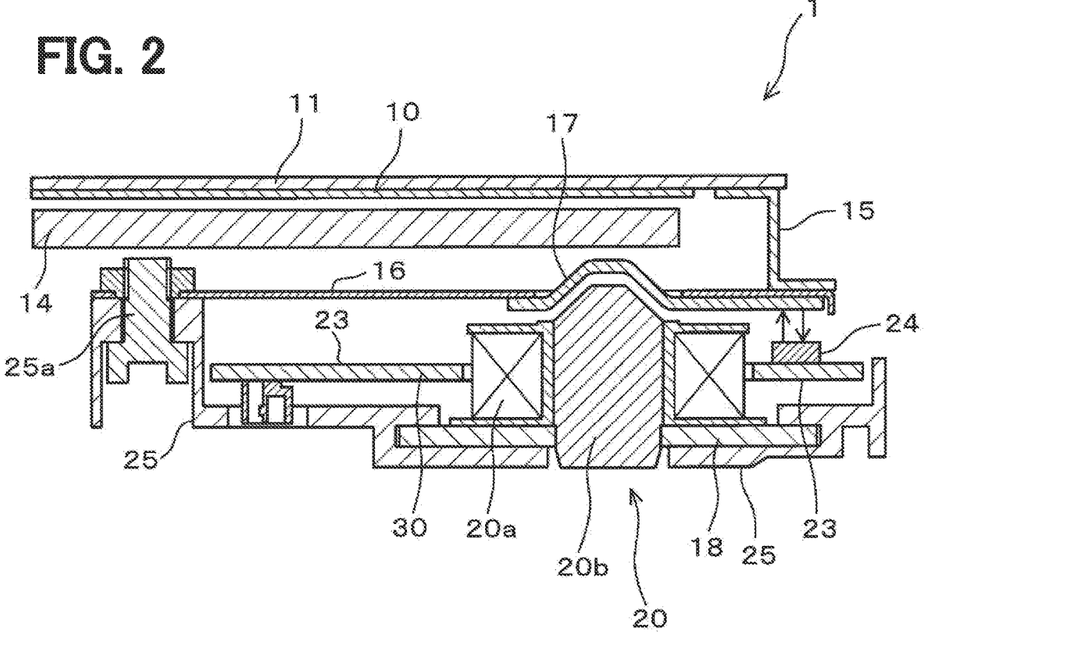
FIG. 2 is a vertical sectional view illustrating a schematic configuration of a part of the electronic apparatus taken along the line II-II of FIG. 3.
Figure 3:
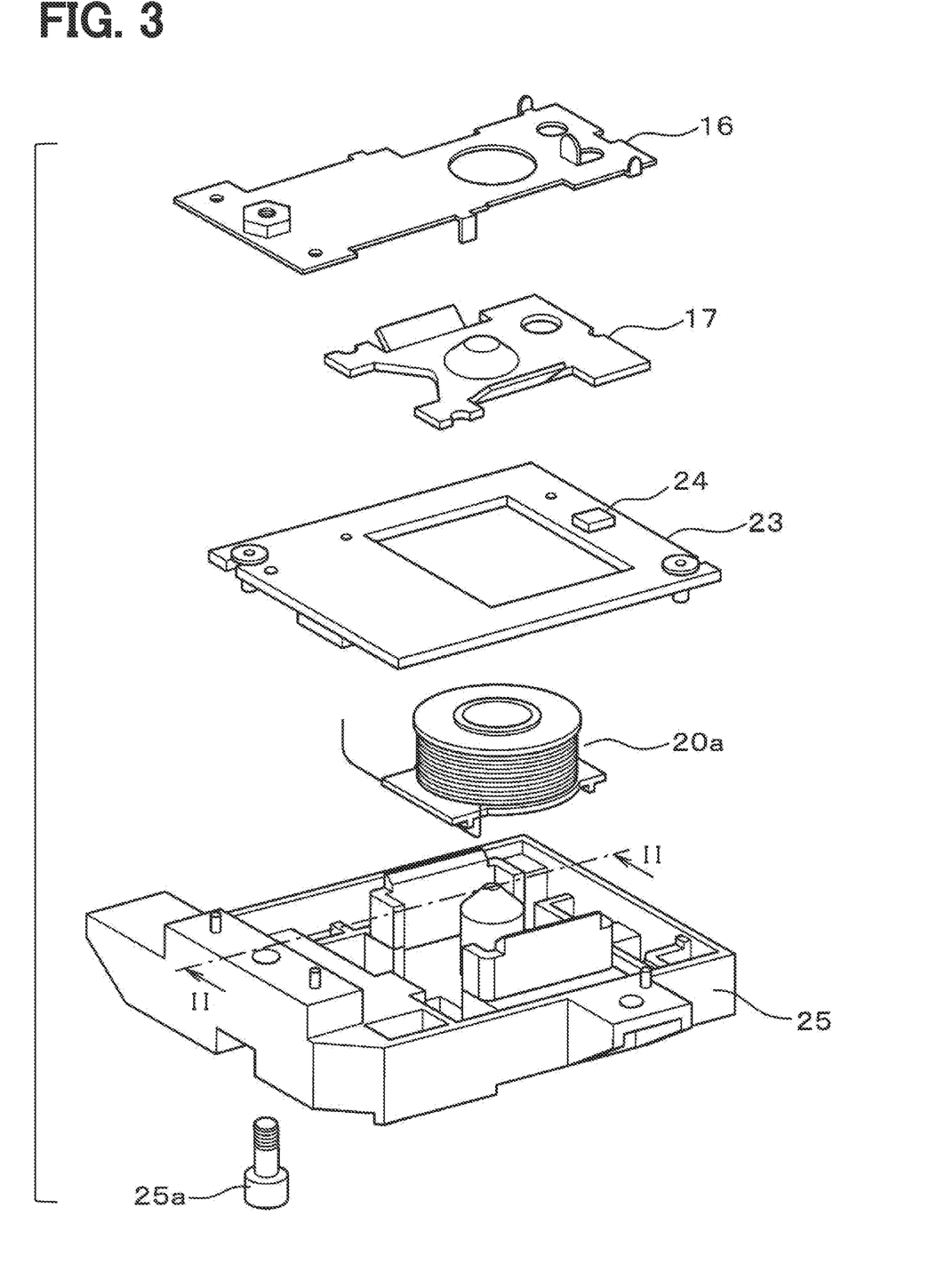
FIG. 3 is an exploded view illustrating a schematic configuration of the electronic apparatus.

As shown in FIGS. 1 to 3, the electronic apparatus 1 includes a touch panel 10, a vibration generator 20, a gap distance detector 24, a sound generator 26, and a controller 30 that is connected via a communication link with the foregoing devices to control. The back surface of the electronic apparatus 1 is covered with a case 25. The surface of the touch panel 10 is covered with an overlay 11. The touch panel 10 and the overlay 11 are laminated and integrally configured.

The touch panel 10 includes a display screen 10a and a finger position detector 10b. The display screen 10a, which may be a TFT liquid crystal display, is configured to display various information and/or switches, buttons, etc. for the user to operate.

The finger position detector 10b is attached to the back surface side of the overlay 11, that is, the side of the display screen 10a. When the user's finger touches the overlay 11, the finger position detector 10b detects a change in the capacitance value due to absorption of a part of the lines of electric force by the touched finger. Thereby, the position touched by the finger can be detected.

With the above configuration, the touch panel 10 functions as a display screen and a finger position detector. The touch panel 10 also functions as an operation unit that is used for the user to operate the electronic apparatus 1 by touching the displayed switch, for example, with the user's finger or the like.

A backlight 14 is provided below the touch panel 10. The backlight 14 is a light source that illuminates the touch panel 10 with light. By illuminating the touch panel 10 with light, the characters and the like displayed on the touch panel 10 can be visually recognized.

The vibration generator 20, which may also be referred to as a vibrator, has a function of giving vibration to the touch panel 10. The vibration generator 20 includes an electromagnetic coil 20a and a fixed iron core 20b. The case 25 is provided with a fixed yoke 18 formed by insert molding; the vibration generator 20 is fixedly arranged on the fixed yoke 18 fixed to the case 25.

The first embodiment describes an example in which a solenoid actuator is used as the vibration generator 20. In addition, as the actuator, a vibration motor type actuator using an eccentric rotating body, a linear resonance actuator driven by a pulse wave matching the resonance frequency of the vibration body, or the like can be used. The vibration generator 20 includes an electromagnetic coil 20a and a fixed iron core 20b. The electromagnetic coil 20a and the fixed iron core 20b are fixed to the fixed yoke 18.

As shown in FIGS. 2 and 3, in the electronic apparatus 1, the leaf spring 16 and the substrate 23 are screwed and fixed to the case 25 by the screws 25a. The movable yoke 17 is fixed to the leaf spring 16 by means such as caulking, and thus is elastically supported by the leaf spring 16.

The movable yoke 17 and the touch panel 10 are integrally connected via the movable frame 15. The movable yoke 17, the movable frame 15, and the touch panel 10 are elastically supported by the leaf spring 16 as a whole. Therefore, the whole of the movable yoke 17, the movable frame 15, and the touch panel 10 can move up and down integrally by an external force.

The movable yoke 17 is arranged at a position facing the upper side of the fixed iron core 20b, with a predetermined distance at which the movable yoke 17 can be attracted by the magnetic force generated by the electromagnetic coil 20a. By repeatedly turning on and off the power supply to the electromagnetic coil 20a, the generation and disappearance of the magnetic field in the vibration generator 20 are alternately executed.

When a magnetic field is generated, the movable yoke 17 is attracted toward the vibration generator 20 and moves downward. When the magnetic field disappears, the elastic force of the leaf spring 16 moves the movable yoke 17 away from the vibration generator 20. By repeating this, the movable yoke 17 vibrates in the vertical direction. The fixed yoke 18 is made of a material having a high magnetic permeability, such as iron, and has the function of increasing the magnetic flux density when the vibration generator 20 is turned on.

The movable frame 15 is configured by using a high-rigidity member. Such a high-rigidity member includes, for example, (i) metals such as Fe, Al, and Mg or alloys thereof, (ii) resins such as carbon fiber, ABS (acrylonitrile, butadiene, styrene copolymer synthetic resin), PC (polycarbonate resin), PBT (polybutylene terephthalate resin), (iii) strengthening material with glass or talc added to the resins, and (iv) glass or wood. Accordingly, the vertical movement of the movable yoke 17 is efficiently transmitted to the touch panel 10 via the movable frame 15; the touch panel 10 can be efficiently vibrated.

The gap distance detector 24 is arranged at a position facing the lower surface of the movable yoke 17, and detects the distance to the movable yoke 17, that is, the gap distance. The gap distance detector 24 measures the amount of displacement of the distance to the movable yoke 17 to detect the amount of pressing by the user's finger. In the first embodiment, the gap distance detector 24 is provided on the substrate 23, for example. Accordingly, it is possible to detect the vertical movement of the movable yoke 17, that is, the vertical movement of the touch panel 10. It is thus possible to detect the amount of pressing of the touch panel 10 by the user's finger, the pressing speed, and the like. The sound generator 26 is a device that generates sound, and is, for example, a speaker. The generated sound may be, for example, a sampled sound such as a mechanical sound or an operation sound generated when a mechanical switch or a button is operated, or a sound created by imitating these sounds.

The controller 30 is provided on the substrate 23. The controller 30 is a processor including, for example, a CPU, a RAM, a ROM, an I/O, and the like. The controller 30 executes various controls on the touch panel 10, the vibration generator 20, the gap distance detector 24, and the sound generator 26 by executing a program stored in the ROM, for example.

Figure 4:
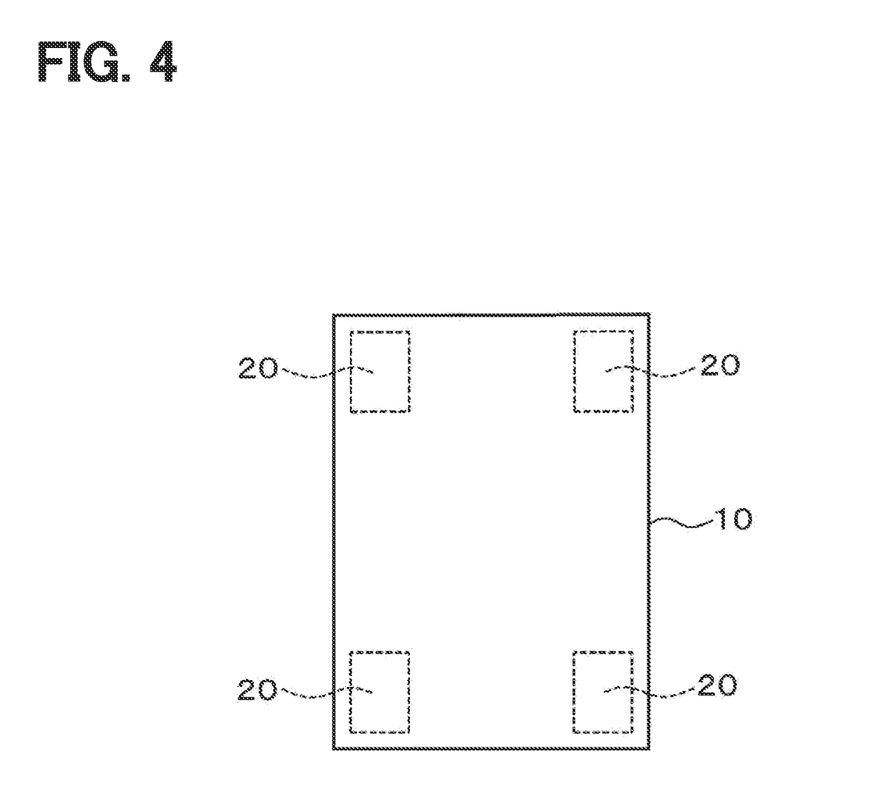
FIG. 4 is a diagram illustrating an outline of a modification of an arrangement position of a vibration generator.

As shown in FIG. 4, the vibration generators 20 may be arranged to be dispersed in a plurality of positions. FIG. 4 exemplifies a configuration in which the vibration generators are arranged to be dispersed at the four corners of the touch panel 10. When the vibration generators 20 are arranged to be dispersed in this configuration, the mass of the movable unit shared by the individual vibration generators 20 becomes small. Therefore, it is possible to improve the efficiency of transmission of generated vibration.

Further, when the vibration generators 20 are arranged in a dispersed manner, damping of vibrations given to the user via the touch panel 10 is suppressed. Therefore, touch sensitivity to the user can be improved. Further, since the individual vibration generators 20 can be downsized, it is possible to downsize the electronic apparatus 1 as a whole. The following will describe the control executed in the electronic apparatus 1.

Figure 5:
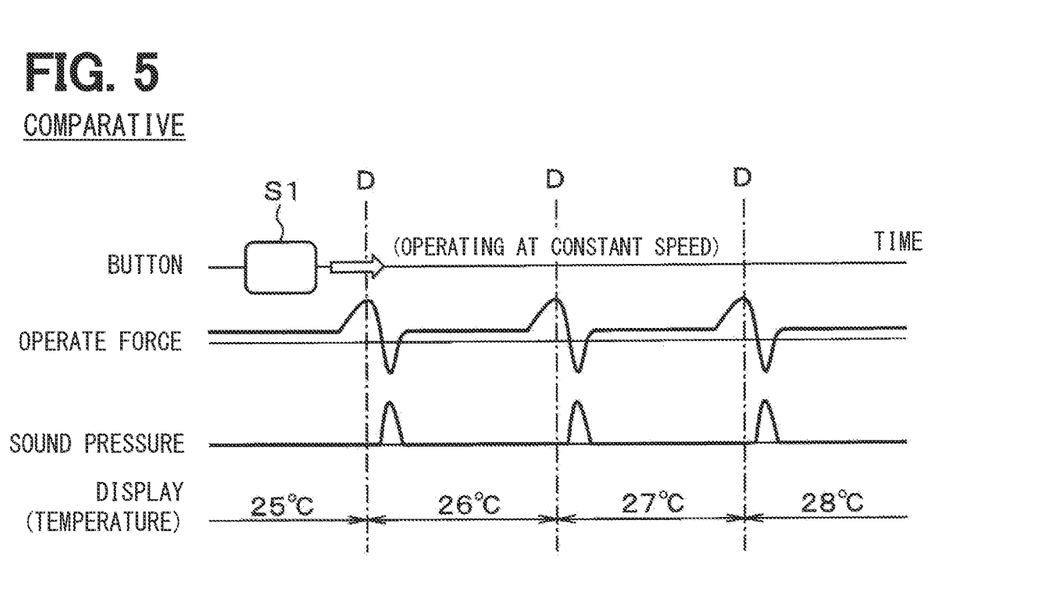
FIG. 5 is a diagram illustrating an outline of operation by a mechanical slide switch as a comparative example.

FIG. 5 is a diagram for explaining an outline of a switch operation in a typical mechanical slide switch for comparison with the control according to the first embodiment. As shown in FIG. 5, in the mechanical slide switch, the temperature of the air conditioner is set by sliding the button S1 with a finger.

The button S1 functions as an operation unit. The button S1 is a slide-type operation unit that slides in the left-right direction in FIG. 5 by a slide operation with the user's finger. When the button S1 is slid, the detent D is provided at the boundary between the temperature regions of 26 degrees, 27 degrees, . . . .

A detent is a mechanism that holds an operating unit (button S1 here) in a predetermined position by an artificially created resistance in an actual mechanical switch, for example, a mechanism configured by using a notch and a spring resistance. Moving to another position requires applying force that overcomes this resistance. After exceeding the detent D, the switch moves ahead due to the action of the spring resistance and the notch. As a result, the operating force becomes negative and the user feels that his or her finger is pulled in the operating direction.

Therefore, at the timing of crossing over the detent D, the finger for operating the button S1 is accompanied by resistance, so that the user's finger requires an operating force as shown in FIG. 5. Further, at the timing when the finger feels pulling in when crossing over the detent D, a sound is generated as indicated by the sound pressure shown in FIG. 5.

Figure 6:
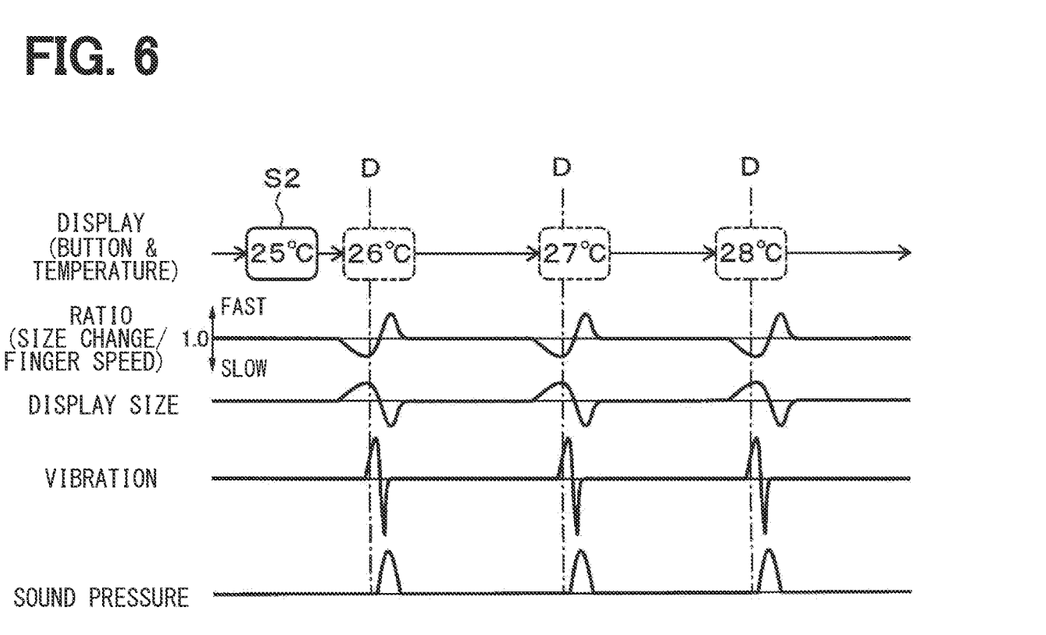
FIG. 6 is a diagram illustrating an outline of display control of a software switch according to the first embodiment.

In the control according to the first embodiment, as shown in FIG. 6, an example is illustrated in which an operation for setting the temperature of, for example, an air conditioner is performed by sliding the button S2 with a finger in the direction indicated by the arrow, as in the mechanical slide switch. The button S2 functions as an operation unit.

As shown in FIG. 6, on the touch panel 10, a button S2 is displayed with a software program. By sliding the button S2 with a finger, the button S2 crosses over the detent D provided at the boundary of each temperature region of 26 degrees, 27 degrees, . . . . At the timing of crossing over the detent D, the display size of the button S2 is changed, and the ratio of the display size change speed of the button S2 to the finger moving speed is changed. The finger speed is calculated by the controller 30 using the finger position information detected on the touch panel 10.

The control is performed to change the display size of the button S2 according to the timing of crossing over the detent D as follows. First, in the first half, the ratio of the display size change to the finger speed is set to one (1) or less. That is, while the speed of display size change is decreased, the display size of the button S2 is changed to be larger (first display control). Next, in the latter half, the ratio of the display size change to the finger speed is set to one (1) or more. That is, while the speed of the display size change is increased, the display size of the button S2 is changed to be smaller (second display control). In other words, with reference to FIG. 6, in cases that the button S2 with a display size being a reference size crosses over the detent D, a control is performed by including a first display control and then a second display control. The first display control is performed in which the display size of the operation unit is changed to be larger than the reference size in a first period of time; then, the second display control is performed in which the display size of the operation unit is changed to be smaller than the reference size in a second period of time that is equal to or shorter than the first period of time.

Further, at the timing of crossing over the detent D, the vibration is generated by the vibration generator 20. The sound is generated by the sound generator 26 in response to the end of the first display control (i.e., the start of the second display control).

With the above control, the user can recognize (i) the display change of the button S2 on the touch panel 10 by a sense of vision, (ii) the vibration on the touch panel 10 due to the vibration of the vibration generator 20 by a sense of touch, and (iii) the utterance of the sound by the sound generator 26 by a sense of hearing.

The electronic apparatus 1 according to the first embodiment provides the following effects. In the electronic apparatus 1 according to the first embodiment, the operation button S2 is controlled to change the display size of the button S2 on the touch panel 10 at the timing of crossing over the detent D, while generating the vibration with the vibration generator 20 to vibrate the touch panel 10. Further, the sound generator 26 generates a sound.

When the software button S2 is operated as described above, the visual information, the tactile information, and the auditory information are linked and transmitted according to the timing of passing the detent D. It is thus possible to improve the feedback effect to the operation by the user. Under the above configuration, it is possible to provide a more realistic operation feeling to the user when operating the touch panel, so that the user's recognition of the operation can be improved.

Second Embodiment

Figure 7:
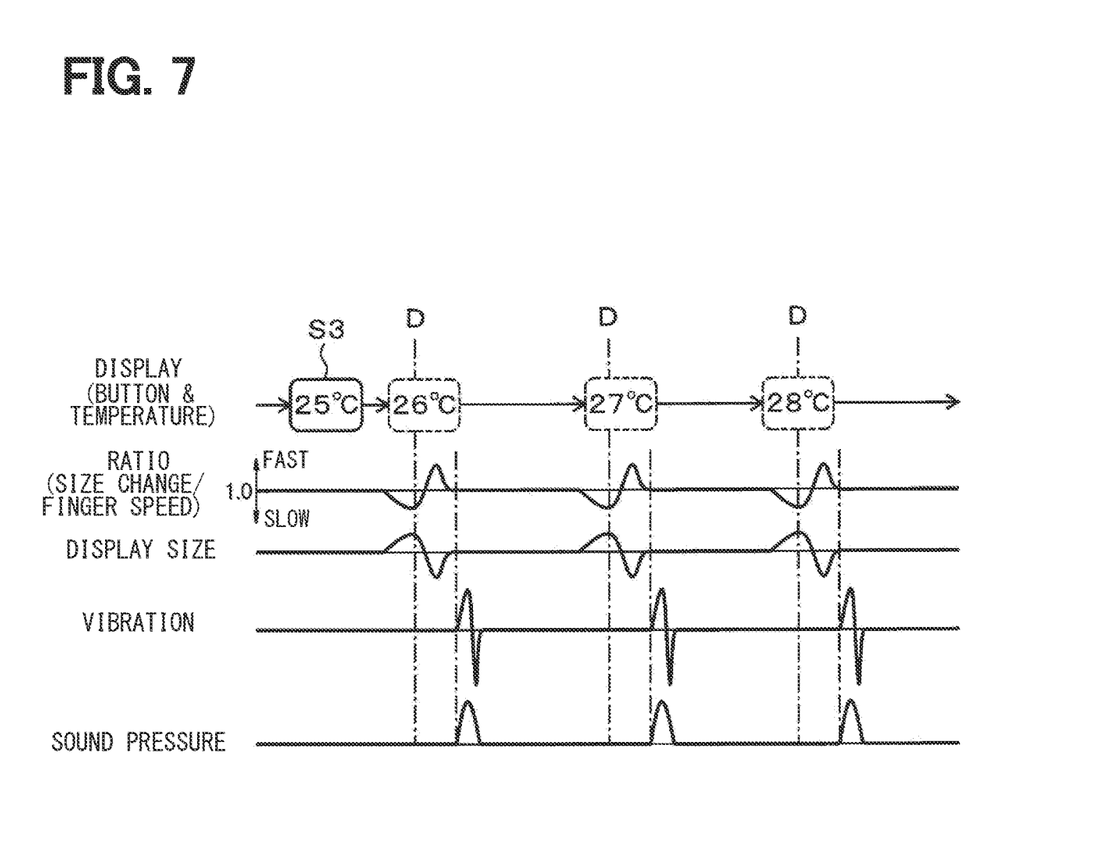
FIG. 7 is a diagram illustrating an outline of display control of a software switch according to a second embodiment.

A second embodiment will be described with reference to FIG. 7. In the electronic apparatus 1 according to the second embodiment, the first display control and the second display control in the first embodiment are performed on an operation button S3. The button S3 functions as an operation unit. Then, at the end of the second display control, the touch panel 10 is vibrated due to the vibration generation by the vibration generator 20, and the sound is generated by the sound generator 26. The other configuration is the same as that of the first embodiment.

According to the second embodiment, the same effect as the first embodiment can be obtained. Further, according to the electronic apparatus 1 according to the second embodiment, the vibration of the touch panel 10 and the generation of the sound by the sound generator 26 are set at the end of the second display control. This enables the user to feel a strong sense of boundary such as hitting a wall when the button S3 is operated.

Third Embodiment

The following control is performed in the electronic apparatus 1 according to a third embodiment. The other configuration is the same as that of the second embodiment.

Figure 8:
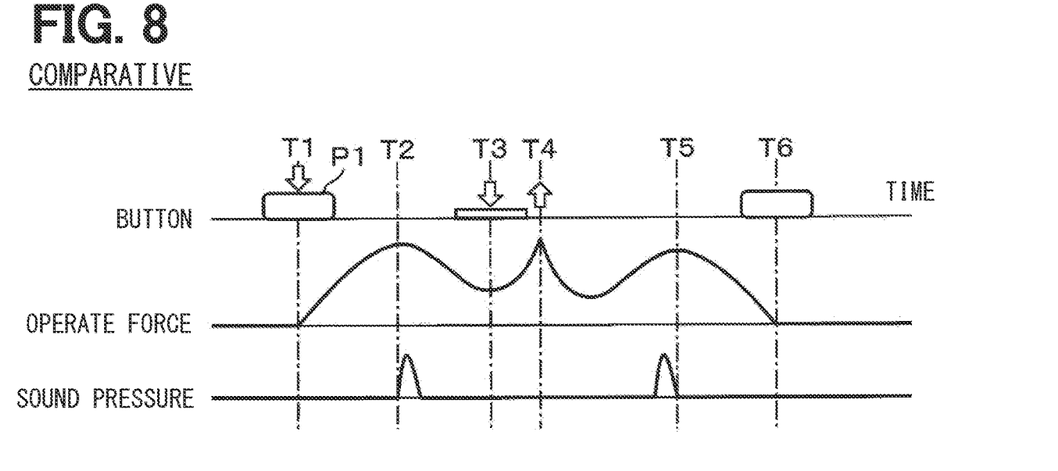
FIG. 8 is a diagram illustrating an outline of operation by a mechanical push switch as a comparative example.

FIG. 8 is a diagram for explaining an outline of a switch operation in a typical mechanical push switch button, that is, a mechanical push button, for comparison with the control according to the first and second embodiments. FIG. 8 exemplifies an operation example when the button P1 is pressed with a finger. The button P1 functions as an operation unit. It is assumed that the switch is turned on or off by pressing the button P1.

FIG. 8 illustrates several timings as follows: Timing T1 at which pressing of the button P1 is started (pressing start timing); Timing T2 at which the pressing force reaches a first maximum value; Timing T3 at which the pressing force becomes a minimum value; Timing T4 at which the button P1 is bottoming; Timing T5 at which the pressing force becomes a second maximum value after having decreased to the minimum value; and Timing T6 at which the pressing is ended after the button P1 has been pushed back and the pressing force has disappeared (pressing end timing). Here, bottoming means that in cases that a mechanical push switch button is pressed, the button reaches the pressing limit and the pressing is stopped. Alternatively, the bottoming means a pseudo feeling that the button reaches the pressing limit and the pressing is stopped. The timing T4 of bottoming is also the timing at which the pressing is returned.

When the button P1 is a mechanical button, the operation force (i.e., the pressing force) changes as follows: after increasing from timing T1 to timing T2, the operation force reaches a maximum value; after decreasing slightly, the operation force becomes a minimum value at timing T3; after increasing again, the operation force peaks at timing T4 at which the button P1 is bottoming; after decreasing and then increasing again, the operation force reaches the maximum value at timing T5; and after decreasing, the operation ends and the pressing force disappears at timing T6.

Further, a sound accompanying the operation is generated as shown by the sound pressure in FIG. 8 in correspondence with the timings T2 and T5 at which the operation force takes the respective maximum values. In the third embodiment, for example, the timing T2 is the start timing of sound generation, and the timing T5 is the end timing of sound generation, for example.

Figure 9:
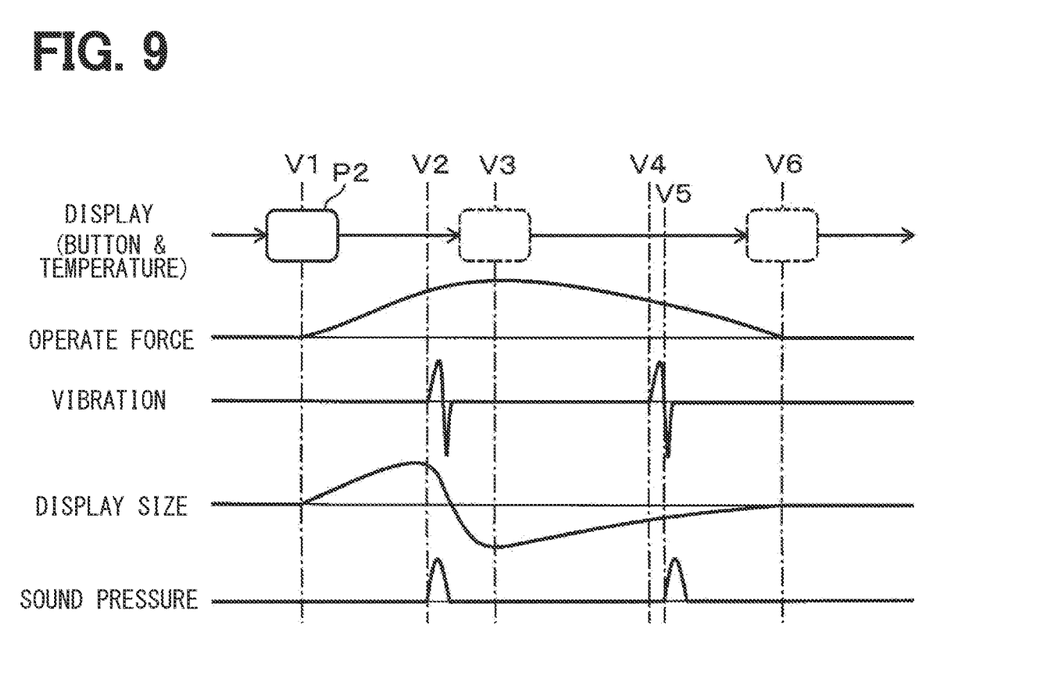
FIG. 9 is a diagram illustrating an outline of display control of a software switch according to a third embodiment.

The control according to the third embodiment is performed as shown in FIG. 9. In FIG. 9, the operation force means the pressing force with which the user presses the touch panel 10. The button P2 is a button displayed on the touch panel 10 by controlling the display screen 10a by software by the controller 30, and is configured to be operated by the user with a finger. The button P2 functions as an operation unit imitating a push-down button. The amount of depression of the button P2 is detected by the gap distance detector 24.

At timing V1, the user starts pressing the button P2 displayed on the touch panel 10. At timing V3, the operation force reaches a maximum and bottoms out. Then the operation force decreases. At timing V4, the pressing ends and the operation force disappears. Timing V3 roughly corresponds to bottoming of the mechanical push switch button.

The vibration is generated by the vibration generator 20 at a predetermined timing V2 between the timings V1 and V3 and a predetermined timing V4 between the timings V3 and V6. The sound is generated by the sound generator 26 at timing V2 that matches the occurrence of vibration and timing V5 that matches the timing of reversing the amplitude of the vibration.

The display size of the button P2 on the touch panel 10 changes as follows: the display size gradually changes from timing V1 and becomes maximum at timing V2; after changing to a smaller size, the display size becomes extremely small at timing V3; and then, the display size gradually changes to a reference size at timing V6.

The user can recognize several senses as follows. The change in the display size of the button P2 on the touch panel 10 is recognized by a sense of vision with the eye. The vibration of the touch panel 10 is recognized by a sense of touch with the finger. The utterance of sound by the sound generator 26 is recognized by a sense of hearing with the ear. The electronic apparatus 1 according to the third embodiment provides the following effects.

In the electronic apparatus 1 according to the third embodiment, in response to the timing of starting pressing the button P2, bottoming out, and returning, the following controls are performed. That is, while the control for changing the display size of the button P2 on the touch panel 10 is performed, the touch panel 10 is vibrated due to the vibration generated by the vibration generator 20, and a sound is generated by the sound generator 26.

In this way, in the pressing operation of the button P2, the visual, tactile, and auditory information is linked and transmitted at a predetermined timing in accordance with a predetermined operation. As a result, it is possible to improve the feedback effect to the operation by the user. This can provide the user with a more realistic operation feeling when operating the touch panel. Therefore, the user's recognition of the operation can be improved.

Fourth to Eighth Embodiments

Figure 10:
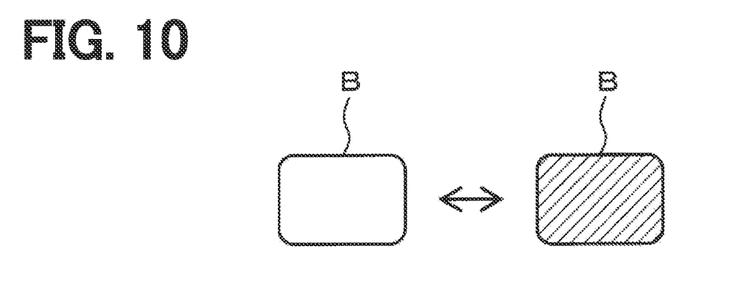
FIG. 10 is a diagram illustrating an outline of display control of a software switch according to a fourth embodiment.
Figure 11:
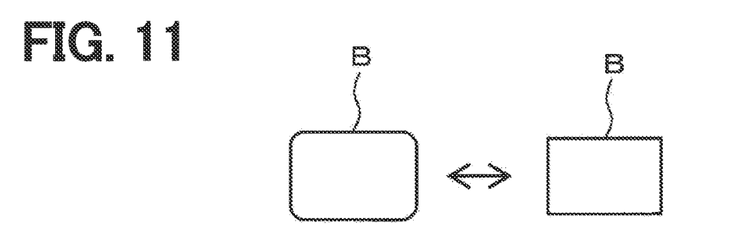
FIG. 11 is a diagram illustrating an outline of display control of a software switch according to a fifth embodiment.

Next, fourth to eighth embodiments will be described with reference to FIGS. 10 to 14. The fourth to eighth embodiments perform the controls in which the image of button B displayed on the touch panel 10 is changed at the timing of crossing over the detent D by the buttons S2 and S3 or the timing of pressing the button P2. In the fourth embodiment, as shown in FIG. 10, a control for giving a color change to the button B is performed. In the fifth embodiment, as shown in FIG. 11, a control for giving a shape change to the button B is performed.

Figure 12:
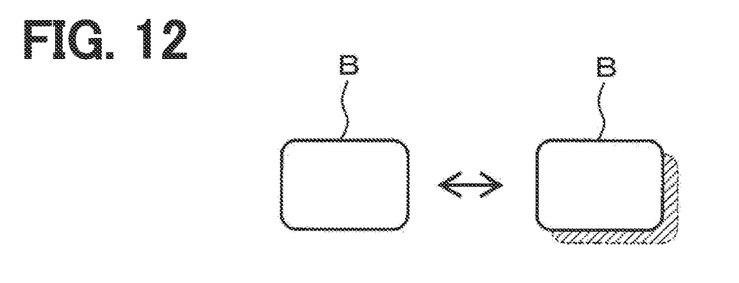
FIG. 12 is a diagram illustrating an outline of display control of a software switch according to a sixth embodiment.

In the sixth embodiment, as shown in FIG. 12, a control for applying an effect such as a shadow to the button B is performed. For example, a control is performed to switch between a state in which a shadow effect is added and a state in which no effect is added. Here, the effect means an effect of adding a decoration such as a shadow to the operation unit (i.e., the button B), or moving, rotating, or swinging the operation unit.

Figure 13:
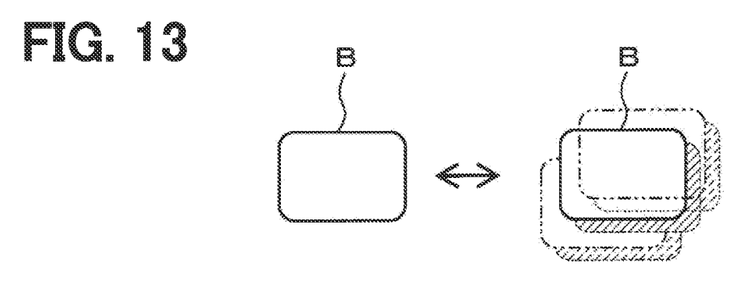
FIG. 13 is a diagram illustrating an outline of display control of a software switch according to a seventh embodiment.

In the seventh embodiment, as shown in FIG. 13, in addition to the configuration described in the sixth embodiment, control for adding an effect of swinging the button B is performed. For example, a control for switching between the state where an effect that adds a decoration such as a shadow is added and the state where no effect is added is performed. The control for adding the effect of swinging the button B with the decoration added is performed. In addition to the above, the effect added to the button B includes movement, rotation, blinking, or pulsation of the button B, during changing its size.

Figure 14:
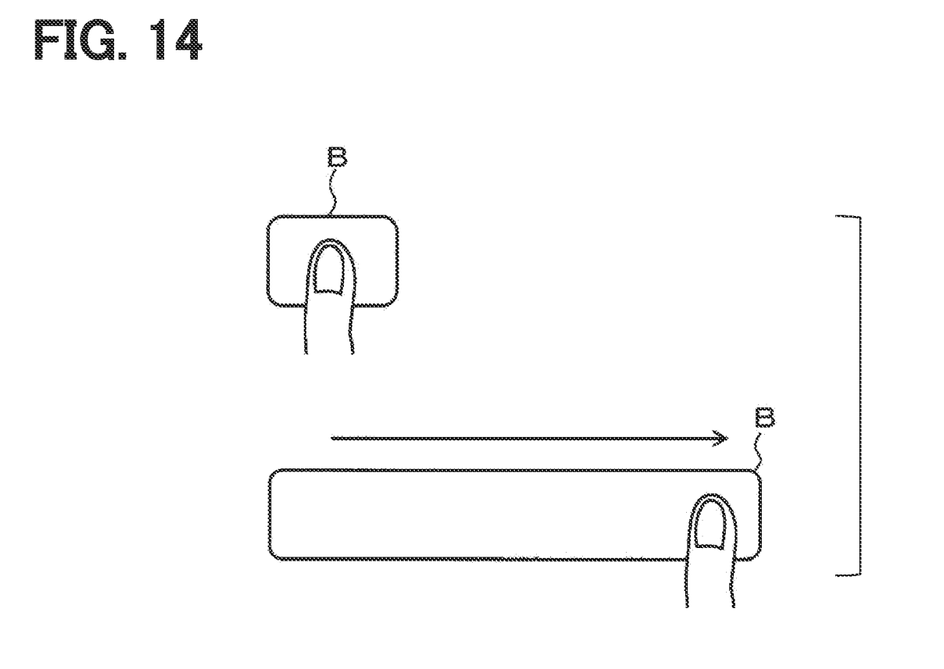
FIG. 14 is a diagram illustrating an outline of display control of a software switch according to an eighth embodiment.

In the eighth embodiment, as shown in FIG. 14, a button B, which is a slide type operation unit, is displayed. When the button B is touched with the user's finger and slid to the right, the left side of the button B remains the same and the right side is moved to the right. As if the button B is extended in the sliding direction of the finger (i.e., the right direction) according to the movement of the finger, the control for changing the length of the button B to be elongated is executed. According to the fourth to eighth embodiments, the same effects as those of the first to third embodiments are obtained.

As described above, the embodiments have been described separately, but they can be combined within a range not departing from the spirit thereof. In the first embodiment and the second embodiment, the control is performed which changes the display sizes of the buttons S2 and S3 at the timing of crossing over the detent D as follows. That is, in the control, in the first half, the display size of the button S2 is made larger with a change speed of which a ratio to the finger speed is set to one (1) or less, that is, as a low change speed. Next, in the latter half, the display size of the button S2 is made smaller with a change speed of which a ratio to the finger speed is set to one (1) or more, that is, as a high change speed. The above first control and the second control may be reversed in an order. By reversing this, it is possible to provide an operation feeling with a groove drop feeling, and thus it is possible to provide an operation feeling with a stronger impression. In the above embodiment, the timing at which the vibration generator 20 generates vibration and the timing at which the sound generator 26 generates sound may be changed. Further, in the above description, the switch or the button displayed on the touch panel 10 is operated by the user's finger, but a touch pen or a stylus may be used for the touch operation instead of the finger.

Although the present disclosure has been described in accordance with the embodiments, it is understood that the present disclosure is not limited to such embodiments and configurations. The present disclosure covers various modification examples and equivalent arrangements. In addition, other combinations and configurations including further only a single element, more or less, are also within the spirit and scope of the present disclosure.

For reference to further explain features of the present disclosure, the description is added as follows.

An operation function of a device equipped with a touch sensor, for example, a touch sensor of a smartphone or a car navigation system is executed by operating an icon, a switch, or the like displayed on the liquid crystal display with a finger. However, when operating a switch or the like displayed on the touch sensor, compared to mechanical switches such as a tact switch and a metal contact switch, feedback at the time of operation, for example, a click feeling or a feeling of unevenness is not transmitted to the user's finger. Therefore, there is an issue that the operation feeling is weak.

A technique has been proposed in which, when a user operates a screen button, the operation surface is vibrated to transmit an operational feeling to the user's finger. In addition, since the vibration force is insufficient and the tactile sensation is weakened as the screen becomes larger, a technique has been proposed in which the vibration and the display corresponding to the vibration are performed according to the pressing force at the time of operation.

However, in the case of an operation such as a slide operation in which the pressing force does not change, or in the case where the display cannot be stared at, such as during driving a car, the effect is reduced. Moreover, since there is no information on sound generated when the mechanical button is actually operated, the operation reality is poor.

It is thus desired to provide an electronic apparatus that provides a more realistic operation feeling to a user when operating a touch panel and improves the user's recognition of the operation.

An aspect of the present disclosure described herein is set forth in the following clauses.

According to an aspect of the present disclosure, an electronic apparatus is provided to include a touch panel, a vibration generator, a sound generator, and a controller. The touch panel is configured to be operated by a finger of a user. The vibration generator is configured to vibrate the touch panel. The sound generator is configured to generate a sound. The controller is configured to control the touch panel, the vibration generator, and the sound generator. Herein, the touch panel includes (i) a finger position detector configured to detect a position of the finger of the user, and (ii) a display screen configured to display an operation unit on the touch panel. In response to an operation by the user onto the operation unit, the controller is configured to provide, in addition to a control provided to the vibration generator to cause the touch panel to vibrate, (i) a control provided to the display screen to change displaying of the operation unit, or (ii) a control provided to the sound generator to generate a sound, or (iv) both the control provided to the vibration generator and the control provided to the sound generator.

According to this configuration, when the touch panel is operated, visual, tactile, and auditory information is linked and transmitted according to a predetermined operation. With this, it is possible to provide a more realistic operation feeling to the user when operating the touch panel, so that the user's recognition of the operation can be improved.

What is claimed is:

1. An electronic apparatus comprising:
a touch panel configured to be operated by a finger of a user;
a vibration generator configured to vibrate the touch panel;
a sound generator configured to generate a sound; and
a controller configured to control the touch panel, the vibration generator, and the sound generator,
wherein:
the touch panel includes (i) a finger position detector configured to detect a position of the finger of the user on the touch panel, to detect a sliding operation of the finger of the user on the touch panel, and to detect a pressing operation of the finger of the user on the touch panel, and (ii) a display screen configured to display an operation unit on the touch panel, the operation unit having a default display size;
the controller is further configured to control the display screen to change a display of the operation unit on the display screen; and
in response to the finger position detector detecting the finger of the user pressing and sliding the operation unit on the display screen in order to move a display position of the operation unit on the display screen, the controller is further configured to control the display screen to change the display of the operation unit, in addition to controlling at least one of
(i) the vibration generator to vibrate the touch panel, and
(ii) the sound generator to generate a sound,
wherein:
the display screen of the touch panel is further configured to display, as the operation unit, a slidable operation unit configured to be slid on the display screen by the finger of the user;
the display screen includes at least one virtual detent; and
in response to the finger position detector detecting the finger of the user sliding across the virtual detent on the display screen, and the display screen changing the display of the operation unit in order to move the display position of the operation unit across the virtual detent, the controller is further configured to
perform a first display control to change the display of the operation unit in order to increase the display size of the operation unit to a larger display size, the larger display size being larger than the default display size of operation unit, the increase to the larger display size occurring at a first change speed, and a ratio of the first change speed of the display size to a speed of the finger of the user is one or less, and
then perform a second display control to change the display of the operation unit in order to decrease the display size of the operation unit, to a smaller display size, the smaller display size being smaller than the default display size of the operation unit, the decrease to the smaller display size occurring at a second change speed, and a ratio of the second change speed of the display size to the speed of the finger of the user is one or more.

2. The electronic apparatus according to claim 1, wherein:
the controller is further configured to control (i) the vibration generator to vibrate the touch panel and (ii) the sound generator to generate a sound, in response to starting the second display control.

3. The electronic apparatus according to claim 1, wherein:
the controller is further configured to control (i) the vibration generator to vibrate the touch panel and (ii) the sound generator to generate a sound, in response to ending the second display control.

4. The electronic apparatus according to claim 1, wherein:
the display screen of the touch panel is further configured to display the operation unit as a push-button operation button on the display screen;
the display screen of the touch panel is further configured to display a simulated pressing of the operation button, wherein the operation button is displayed as being depressed between an unpressed position and a bottom mechanical limit, in response to the finger of the user pressing the operation button on the display screen;

a bottom time of the operation button is defined as a time when the display screen displays the operation button as depressed and at the bottom mechanical limit;

the bottom time of the operation button occurs between a start time of the user pressing the operation button and an end time of the user pressing the operation button; and the controller is further configured to control the vibration generator to vibrate the touch panel at a predetermined first time between the start time of the user pressing the operation button and the bottom time, and at a predetermined second time between the bottom time and the end time of the user pressing the operation button, in response to the finger position detector detecting the finger of the user pressing the operation button.

5. The electronic apparatus according to claim 4, wherein:
the controller is further configured to control the display screen to
change the display of the operation unit in order to increase the display size of the operation unit to the larger display size at the predetermined first time; and
change the display of the operation unit in order to decrease the display size of the operation unit to the smaller display size at the bottom time.

6. The electronic apparatus according to claim 1, wherein:
the controller is further configured to control the display screen to change the display of the operation unit in order to change a color of the operation unit.

7. The electronic apparatus according to claim 1, wherein:
the controller is further configured to control the display screen to change the display of the operation unit in order to change a shape of the operation unit.

8. The electronic apparatus according to claim 1, wherein:
the controller is further configured to control the display screen to change the display of the operation unit in order to switch between a state in which a display effect is added to the operation unit and a state in which the display effect is not added to the operation unit.

9. The electronic apparatus according to claim 1, wherein:
the controller is further configured to control the display screen to change the display of the operation unit in order to switch between a state in which a display effect is added to the operation unit and a state in which the display effect is not added to the operation unit, in response to finger position detector detecting the finger of the user shaking the operation unit and the operation unit being in the state where the display effect is added.

10. The electronic apparatus according to claim 1, wherein:
the controller is further configured to perform a display control to change the display of the operation unit in order to change a display length of the operation unit in a sliding direction of the operation unit, in response to the finger position detector detecting the finger of the user pressing and sliding the operation unit on the display screen.

11. An electronic apparatus comprising:
a touch panel configured to be operated by a finger of a user, the touch panel including (i) a detector configured to detect a position of the finger of the user on the touch panel, to detect a sliding operation of the finger of the user on the touch panel, and to detect a pressing operation of the finger of the user on the touch panel, and (ii) a display screen configured to display an operation switch on the touch panel, the operation switch having a default display size;

a vibrator configured to vibrate the touch panel;

a speaker configured to generate a sound; and a processor connected with the touch panel, the vibrator, and the speaker via a communication link, the processor being configured to control the touch panel, the vibrator, and the speaker, and the processor being further configured to control the display screen to change a display of the operation switch, wherein:
in response to the detector detecting the finger of the user pressing and sliding the operation switch on the display screen in order to move a display position of the operation switch on the display screen, the processor is further configured to control the display screen to change the display of the operation switch in addition to controlling at least one of
(i) the vibrator to vibrate the touch panel, and
(ii) the speaker to generate a sound, wherein:
the touch panel further includes a plurality of predefined virtual regions and a plurality of virtual boundaries, each of the plurality of predefined virtual regions having one of the plurality of virtual boundaries disposed between another of the plurality of predefined virtual regions, the display screen of the touch panel is further configured to display, as the operation switch, a slidable operation switch configured to be slid on the display screen by the finger of the user in order to slide the operation switch over the plurality of predefined virtual regions and the plurality of virtual boundaries on the touch screen, in response to the detector detecting the finger of the user sliding across one of the plurality of virtual boundaries and the display screen changing the display of the operation switch in order to move the display position of the operation switch across the one of the plurality of virtual boundaries, the processor is further configured to perform a first display control to change the display of the operation switch in order to increase the display size of the operation switch to a larger display size, the larger display size being larger than the default display size, and the increase of the display size of the operation switch occurring within a first distance after the operation switch slides across the one of the plurality of virtual boundaries, and then perform a second display control to change the display of the operation switch in order to decrease the display size of the operation switch to a smaller display size, the smaller display size being smaller than the default display size, and the decrease of the display size of the operation switch occurring within a second distance after the operation switch slides across the one of the plurality of virtual boundaries and the first distance, and the second distance being equal to or shorter than the first distance.

12. The electronic apparatus according to claim 11, wherein:
the processor is further configured to control (i) the vibrator to vibrate the touch panel and (ii) the speaker to generate a sound, in response to starting the second display control.

13. The electronic apparatus according to claim 11, wherein:

the processor is further configured to control (i) the vibrator to vibrate the touch panel and (ii) the speaker to generate a sound, in response to ending the second display control.

14. The electronic apparatus according to claim 11, wherein:
each of the plurality of virtual boundaries disposed between two of the plurality of predefined virtual regions includes
a first edge within one of the two predefined virtual regions,
an abutting point wherein the one of the two predefined virtual regions abuts another of the two predefined virtual regions, and
a second edge disposed within the other of the two predefined virtual regions; and
the first edges, the abutting points, and the second edges for all of the plurality of virtual boundaries are defined as virtual positions on the touch panel; and
in response to the detector detecting the finger of the user sequentially sliding across the first edge, the abutting point, and the second edge of one of the plurality of virtual boundaries and the display position of the operation switch moving sequentially across the first edge, the abutting point, and the second edge of the one of the plurality of virtual boundaries, the processor is further configured to perform the first display control and then perform the second display control.

15. The electronic apparatus according to claim 14, wherein:
the abutting point is disposed between the first edge and the second edge for each of the plurality of virtual boundaries; and
a distance from the first edge to the second edge in each of the plurality of virtual boundaries is a sum of the first distance and the second distance.

16. An electronic apparatus comprising:
a touch panel configured to be operated by a finger of a user, the touch panel including (i) a position detector configured to detect a position of the finger of the user on the touch panel, and (ii) a display screen configured to display an operation switch on the touch panel, the operation switch having a default display size;
a displacement detector configured to detect pressing by the finger of the user onto the touch panel by detecting a displacement of the touch panel;
a vibrator configured to vibrate the touch panel;
a speaker configured to generate a sound; and
a processor connected with the touch panel, the displacement detector, the vibrator, and the speaker via a communication link, the processor being configured to control the touch panel, the displacement detector, the vibrator, and the speaker, and the processor further configured to control the display screen to change a display of the operation switch,
wherein:
in response to an operation by the user onto a display position of the operation switch on the touch panel, the processor is further configured to (i) control the vibrator to cause the touch panel to vibrate, (ii) control the display screen to change the display of the operation switch, and (iii) control the speaker to generate the sound;
the touch panel displays is further configured to display the operation switch as a push-button operation button on the display screen;
the display screen of the touch panel is further configured to display a simulated pressing of the operation button, wherein the operation button is displayed as being depressed between an unpressed position and a bottom mechanical limit, in response to the finger of the user pressing the display position of the operation button on the display screen;
a bottom time of the operation button is defined as a time when the display screen displays the operation button as depressed and at the bottom mechanical limit;
the bottom time of the operation button occurs between a start time of the user pressing the display position of the operation button on the display screen and an end time of the user pressing the display position of the operation button on the display screen;
the processor is further configured to control the vibrator to vibrate the touch panel at a predetermined first time between the start time of the user pressing the display position of the operation button and the bottom time, and at a predetermined second time between the bottom time and the end time of the user pressing the display position of the operation button, in response to detecting the finger of the user pressing the display position of the operation button on the display screen; and
the processor is further configured to control the display screen to
change the display of the operation switch in order to increase a display size of the operation switch to a larger display size at the predetermined first time, the larger display size being larger than the default display size of the operation switch, and
change the display of the operation switch in order to decrease the display size of the operation switch to a smaller display size at the bottom time, the smaller display size being smaller than the default display size of the operation switch.

* * * * *